July 11, 1939.   F. E. SCHNEIDER   2,165,659
LOCKING MEANS FOR FUEL TANK CAPS
Filed June 10, 1937
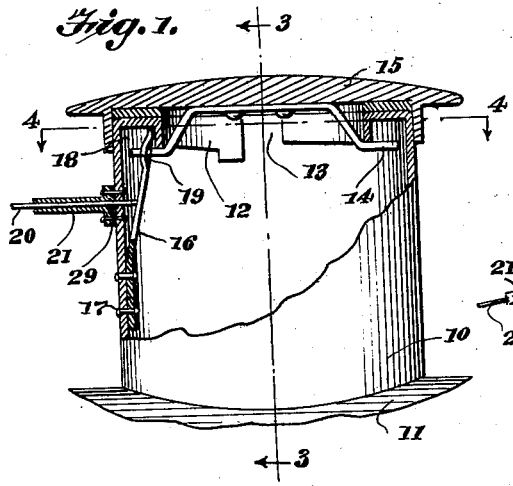
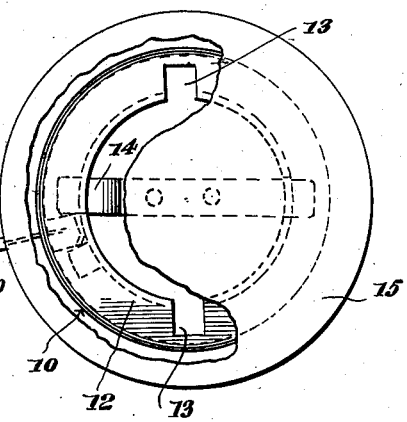
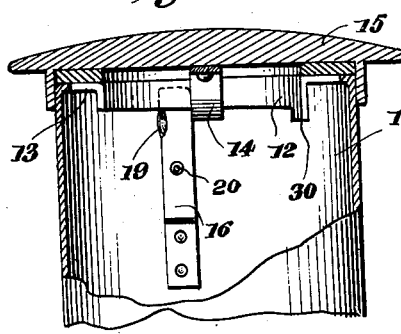
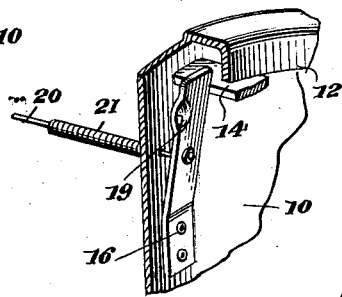
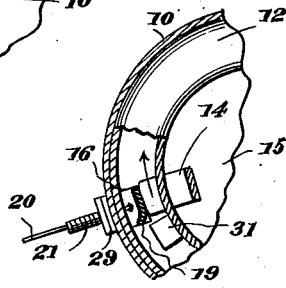
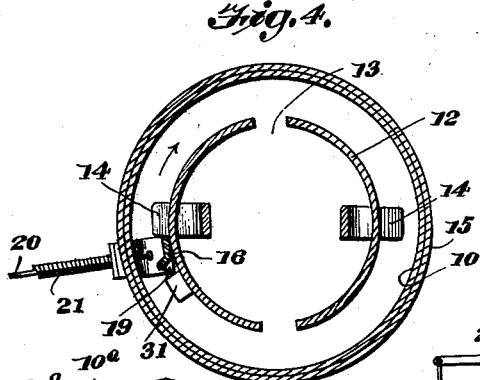
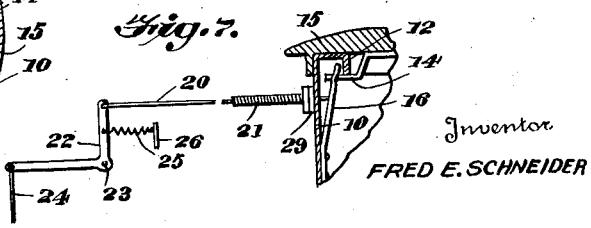
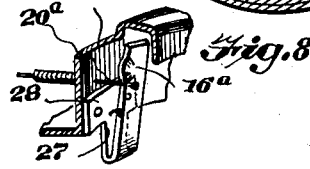
Inventor
FRED E. SCHNEIDER
By Irving R. McEathran
Attorney Patented July 11, 1939

2,165,659

UNITED STATES PATENT OFFICE 2,165,659

LOCKING MEANS FOR FUEL TANK CAPS

Fred E. Schneider, Grand Junction, Colo.

Application June 10, 1937, Serial No. 147,539

1 Claim. (Cl. 292—84)

This invention relates to locking means for fuel tank caps and has for its object the production of a simple and efficient locking means for the closure for a fuel tank of an automobile, or other vehicle, the lock being so constructed as to prevent the removal of the cap by unauthorized parties and thereby prevent the syphoning of the gas from the tank.

Another object of this invention is the production of a simple and efficient locking means for automatically locking a cap upon an automobile or similar vehicle fuel tank and preventing the unauthorized removal of the cap through the medium of a remotely controlled locking device.

A further object of this invention is the production of an extremely simple automatic locking device for a fuel tank cap, the locking device being remotely controlled from the dash of an automobile or similar vehicle, or through the medium of a pedal or other suitable actuating means.

Other objects and advantages of the present invention will appear throughout the following specification and claim.

In the drawing:

Figure 1 is a vertical sectional view through a conventional fuel tank neck showing the cap in a locked position, a portion of the neck and tank being shown in elevation;

Figure 2 is a top plan view of the cap, a portion of which is broken away showing a portion of the tank neck in top plan view;

Figure 3 is a vertical sectional view taken on line 3—3 of Figure 1;

Figure 4 is a horizontal sectional view taken on line 4—4 of Figure 1;

Figure 5 is a fragmentary sectional perspective view of a portion of the tank neck illustrating the locking means for the cap;

Figure 6 is a fragmentary top plan view of a portion of the tank neck and cap showing one of the locking arms engaging the locking device;

Figure 7 is a fragmentary vertical sectional view through a portion of the tank neck and cap showing one form of the remote control operating means for actuating the locking device;

Figure 8 is a fragmentary sectional perspective view illustrating a modified type of locking device;

Figure 9 is a fragmentary perspective view showing a stop tongue carried by one of the cam flanges for bracing the locking member.

It is a well-known fact that many attempts have been made to provide a locking means for fuel tank caps, but those devices which have heretofore been perfected have involved complicated structures, expensive to manufacture and in many instances difficult to operate. It is known that prior patents have been issued upon various forms of locking means for engaging a fuel tank cap requiring a key for releasing the cap and various forms of locking means have been produced for gripping the cap and holding the same in position upon the neck of the tank. Such devices, however, have been found impractical from a commercial standpoint because of their expense, their lack of dependability, as well as the cost of installation and maintenance. For these reasons, I have devised the very inexpensive, efficiently operating and dependable locking device requiring only a minimum number of parts described as follows:

By referring to the drawing, it will be seen that 10 designates the filling neck of a fuel tank 11, which filling neck is provided with the conventional inturned cam locking flanges 12 which are notched, as at 13, for the purpose of receiving the rigid radially extending locking arms 14 which are carried by the under face of the cap 15.

A spring locking plate 16 is riveted or otherwise secured, as at 17, to the inner wall of the neck 10 and extends upwardly, and is normally inclined inwardly toward the center of the neck 10, the upper end underlying the overhanging cam flange 12, as shown in Figure 1, and being normally located adjacent the depending portion of the cam flange 12 in the path of movement of the locking arms 14. This locking plate 16 is formed of spring metal and is so constructed as to normally assume the position shown in Figure 1 and to extend diagonally across the channel 18 formed under the cam locking flange 12. The locking plate 16 is provided along one of its side edges with an inwardly pressed socket 19 near its upper edge and in the path of movement of the locking arms 14 so that the ends of the locking arms 14 may easily ride over the spring locking plate 16 when the cap 15 is rotated in a clockwise direction, as indicated by the arrow in Figure 4. As soon as the locking arm 14 which engages the locking plate 16 passes the plate 16, the plate 16 will immediately snap in back of the locking arm 14 which has just ridden thereover and prevent the locking arm 14 from returning in an opposite direction and also prevent the removal of the cap 15. The cap 15 is inserted in the conventional manner upon the neck 10 by dropping the locking arms 14 down through the notches 13 and by rotating the cap 15 in a clockwise direction, as indicated by the arrow in Figure 4, the spring nature of the locking plate 16 as well as the inwardly pressed portion 19 along one edge permitting the locking arm 14 engaging the plate 16 to ride thereover and press the locking plate 16 against the inner wall of the neck 10 until the arm 14 has passed the plate 16 at which time the plate 16 will assume the position shown in full lines in Figure 4 and prevent the rotation of the cap 15 and the movement of the arms 14 in a counter-clockwise direction opposite to that as indicated by the arrow in Figure 4. The locking plate 16 will in this manner automatically lock the cap 15 against accidental and unauthorized removal from the neck 10.

The far end of each cam locking flange 12 is provided with a depending stop portion 30 to prevent the locking arms 14 from being forced clear on through to the next notch, when the cap 15 is rotated in a clockwise direction. A stop tongue 31 is bent inwardly from the lower edge of one of the flanges 12 or formed in any suitable manner, adjacent the locking portion or upper end of the locking plate 16, to brace the locking plate when pressure is brought to bear thereon by the arms 14 when an attempt is made to rotate the cap 15 in a counter-clockwise direction by an unauthorized party while the locking plate 16 is in a locking position.

In order that the locking plate 16 may be released to permit the cap 15 to be removed from the neck 10, this locking plate 16 is engaged by a pull element 20 in the nature of a cable or other suitable means which passes through the side of the neck 10 and through a shielding cable or tube 21. This pull element 20 may be engaged by any suitable operating means remotely located within the body of the vehicle upon which the device is mounted and as illustrated in Figure 7 may be connected to a bell crank lever 22 and biased by a spring 25 and anchored, as at 26, to the body of the vehicle to assist in returning the parts to their normal positions after the operating element 24 is released. A felt or other suitable washer 29 fits around the pull wire 20 between the neck 10 and the inner end of the shielding cable or tube 21, to prevent loss of gasoline which otherwise might leak out through the cable or tube 21.

In Figure 8 there is shown a modified form of the invention wherein 10a designates the tank neck to the inner face of which is secured a spring locking plate 16a, the lower end of which is bent upwardly, as indicated at 27, and terminates in a substantially T-shaped head 28 which is secured to the inner face of the neck 10a, this structure constituting a slightly modified type of means for securing the locking plate 16a to the neck 10a of the tank. A suitable pull element 20a is connected to the locking plate 16a.

It should be understood that certain detail changes may be employed without departing from the spirit of the invention so long as such changes fall within the scope of the appended claim.

Having described the invention, what I claim as new is:

A locking device for locking a cap on the filling neck of a gasoline tank and the like, wherein the filling neck is provided with cam flanges and the cap is provided with radially extending arms rigidly connected to the cap for movement under the cam flanges of the filling neck; said locking device including a resilient member fixed at one portion thereof to said neck and having a locking portion normally lying in the path of movement of one of said arms and being arranged so as to permit movement of said last mentioned arm thereby when said cap is rotated in a closing direction, but prevent movement in an opposite direction; a stop engaging said locking portion for bracing the same against pressure from the radially extending arms of the cap when an attempt is made by an unauthorized party to remove the cap by a counter-clockwise rotation without releasing the resilient member, and means operable from a remote point for moving said locking portion out of its normal position to permit said arm to be moved thereby as said cap is rotated in an opening direction.

FRED E. SCHNEIDER.